United States Patent [19]
Fairbanks et al.

[11] Patent Number: 5,307,003
[45] Date of Patent: * Apr. 26, 1994

[54] VARYING THE SUPPLY VOLTAGE IN RESPONSE TO THE CURRENT SUPPLIED TO A COMPUTER SYSTEM

[75] Inventors: John P. Fairbanks, Sunnyvale; Andy C. Yuan, Saratoga, both of Calif.

[73] Assignee: Poqet Computer Corporation, Sunnyvale, Calif.

[ * ] Notice: The portion of the term of this patent subsequent to Jun. 4, 2008 has been disclaimed.

[21] Appl. No.: 909,922

[22] Filed: Jul. 7, 1992

Related U.S. Application Data

[62] Division of Ser. No. 600,466, Oct. 19, 1990, Pat. No. 5,153,535.

[51] Int. Cl.$^5$ .............................................. G05F 1/613
[52] U.S. Cl. ...................... 323/222; 323/284
[58] Field of Search ................ 323/222, 223, 232, 234

[56] References Cited
U.S. PATENT DOCUMENTS

| | | | |
|---|---|---|---|
| 4,253,055 | 2/1981 | Gatten | 323/284 |
| 4,355,277 | 10/1982 | Davis et al. | 323/222 |
| 4,580,090 | 4/1986 | Bailey et al. | 323/282 |
| 4,634,956 | 1/1987 | Davis et al. | 323/222 |
| 4,885,674 | 12/1989 | Varga et al. | 323/283 |
| 5,021,679 | 6/1991 | Fairbanks et al. | 323/222 |
| 5,073,850 | 12/1991 | Pace | 323/222 |
| 5,138,249 | 8/1992 | Capel | 323/286 |
| 5,153,535 | 10/1992 | Fairbanks et al. | 331/143 |

*Primary Examiner*—J. L. Sterrett
*Attorney, Agent, or Firm*—Skjerven, Morrill, MacPherson, Franklin & Friel

[57] ABSTRACT

Disclosed is a power system for use with a computer, the power system having incorporated in it circuitry for automatically varying the supply voltage output to the computer system based upon the magnitude of the current being supplied to the computer by the power system. Also included in the computer system is a variable frequency clock circuit, the frequency of which changes based upon the supply voltage produced by the power system. This permits, during computer system operation where low voltage and low clock speeds will be sufficient to provide the performance needed, achievement of a power saving since both the voltage and frequency at which the system operates is reduced, thereby markedly reducing the power consumption.

16 Claims, 7 Drawing Sheets

SYMMETRICAL OSCILLATOR

VARYING THE SUPPLY VOLTAGE IN RESPONSE TO THE CURRENT SUPPLIED TO A COMPUTER SYSTEM

This application is a division of application Ser. No. 07/600,466, filed Oct. 19, 1990, now U.S. Pat. No. 5,153,535.

BACKGROUND OF THE INVENTION

1. Field of the Invention

This invention relates to a power system for a computer, and more particularly, to a power system for a computer which automatically selects the voltage to the computer system and also the frequency of operation of the computer system based on the current requirements of the system or upon a control signal from the computer system.

2. Description of the Prior Art

Present day portable computers have limitations on the length of time they operate before exhausting the batteries in the system. Typical portable computers heretofore known operate at a single voltage, typically 5 volts, and utilize system clocks having a fixed frequency. There are certain disadvantages to this in that they do not incorporate features to reduce the load on the batteries and therefore extend their life. In a typical integrated circuit device utilizing CMOS semiconductor devices, the power consumed by the system is expressed by the equation $$P = CV^2F.$$

Since the capacitance of a system is a variable not available for adjustment by designers, the possible variables which could be changed are the system voltage and the operating frequency. Prior art computer systems are known which include clocks having more than one frequency, however the variable frequency clocks were utilized as a function of the mode of operation and not responsive to the average usage over a period of time. In the prior art systems if the power supply was unable to provide the required voltage for a high frequency clock operation, the system would lose data because the clock could not operate at a frequency less than its maximum and was not tailored to permit operation at a lower supply voltage if that was all that was available. Also in the prior art systems there was not the ability to provide a continuing voltage and system clock frequency relationship in which the system clock varied over a continuum of possible supply voltages.

SUMMARY OF THE INVENTION

The present invention relates to a power system and oscillators for use with the computer system which together function to provide operating voltage for the system which is the minimum required for performing the functions of the system and secondly to reduce the frequency of the system clock to also reduce the power consumption of the system. In addition to reducing power by lowering the voltage and frequency, the utilization of a variable frequency oscillator to provide the system clock signals, with the oscillator's frequency varying as a function of the system supply voltage, permits the safeguard of saving system data in circumstances where a heavy load on the system reduces the supply voltage to below that normally required for performing the computational tasks of the system.

The present invention discloses the power system and the oscillators utilized in the computer system described and claimed in copending patent application Ser. No. 07/375,721, filed on Jun. 30, 1989, entitled "Portable Low Power Computer," which is incorporated herein by reference. For the convenience of the reader, certain reference characters utilized in this application correspond to those utilized in the above-identified copending application.

In certain tasks performed by a computer system, such as word processing, it is possible to operate the system clock at a slower clock rate than is required for computational tasks. Similarly, in the word processing mode of operation the circuits in the system may be operated at a lower voltage than is required when computations are being performed. Thus by operating at a slower clock frequency and lower voltage the performance of the system is not degraded from the user's perspective and the power consumed is reduced. Similarly, if the system clock is operating at a lower frequency, the devices utilized in the system may also be operated at a lower voltage since the reduced voltage will still be adequate to provide switching at the lower frequency. For example, in the computer system described and claimed in the above-identified copending patent application which uses the present invention, it has been found that quite adequate performance may be achieved by using a VDD of approximately 3 volts and a 2.3 mHz system clock frequency to process information in the word processing mode of operation. However, when the mode of operation of the computer involves the computation of numerical data, it is desirable, under most circumstances, to perform that function quickly. Accordingly, in the computational mode the power supply output is changed from 3 volts to 5 volts and the system clock frequency changed from 2.3 mHz to 6.6 mHz. Under these latter conditions the maximum speed of processing is achieved. As mentioned above, the advantageous use of a variable frequency oscillator to produce the clock signals (hereinafter the variable frequency oscillator for producing clock signals will be referred to as the VCO) permits the increased computational frequencies as well as protecting data when the system power supply is unable to provide the current required by the load placed on it or when the batteries become discharged by an amount sufficient to degrade system performance. Circuitry is included in the VCO to achieve a percent reduction in operating frequency which is greater than the percent reduction in supply voltage. For example, if the VCO frequency at 5 volts is 6.6 mHz, it would be expected that at 3 volts, based on the same percent reduction in frequency, the VCO operation would be at 3.96 mHz. However it has been found that additional power savings may be achieved by providing for a greater percent reduction and the preferable ratio is that, as noted above, at VDD=3 volts the VCO frequency is 2.3 mHz. Under these conditions, with the formula $P = CV^2F$, power consumption, by changing the voltage from 5 to 3 volts provides almost a 3:1 power savings and additional power saving is achieved by changing the frequency from 6.6 mHz to 2.3 mHz, giving another factor of almost 3 to 1 power reduction. The combination therefore achieves about an 8:1 reduction of power.

In the present invention, the power system is operable in the automatic mode, in which the supply voltage (VDD) is either 3 or 5 volts, or in an override mode, which under control from the processor of the system the power supply output voltage is forced to regulate to the 5 volt limit without regard to the magnitude of the current being drawn by the computer system.

It is an object of the present invention to provide a power system having a plurality of voltage outputs available and a processor clock having a variable frequency to permit the operation of the system to be performed at the lowest voltage and frequency based on the demand of the system to reduce the power consumption.

It is a further object of the present invention to reduce the operating frequency of the processor by changing the frequency of the VCO in order to preserve the integrity of data under conditions such as when the battery voltage is below that required to operate the system without loss of data and in those situations in which the power supply voltage can not be maintained because of the excessive loading on the system.

In accordance with the present invention, a power system is provided for use with a computer, with a power system automatically establishing the magnitude of the supply voltage provided to the computer in response to the magnitude of the current being supplied by the power supply to the computer, the power system comprising a supply voltage generating circuit, a voltage selection circuit for automatically changing the magnitude of the supply voltage based on the current demands of the computer system, with the automatic voltage selection circuit including means for monitoring the magnitude of the current drawn by the computer system.

In accordance with another feature of the present invention, the system clock frequency is changed in response to the magnitude of the supply voltage. Also, the system clock operates over a continuous range of stable voltage and frequency operating points.

In accordance with another feature of the present invention, the power system includes a battery change backup circuit for providing supply voltage to the system during a battery change operation.

In accordance with yet another feature of the present invention, the power system includes a battery condition monitor circuit for providing an output to the computer indicative of the charge condition of the battery.

In accordance with yet another feature of the present invention, an automatic voltage selection override circuit is provided which, in response to a-control signal from the computer system, causes the supply voltage to be limited to a predetermined maximum without regard to the current being drawn by the computer system.

In accordance with a further feature of the invention, a temperature compensation circuit is provided to increase the supply voltage as the ambient temperature increases to maintain the devices in the circuit operating efficiently as their resistance increases with the increase in temperature.

BRIEF DESCRIPTION OF THE DRAWINGS

Other objects and advantages of the invention will become apparent from a study of the specification and drawings in which.

DETAILED DESCRIPTION OF THE INVENTION

Figure 1:
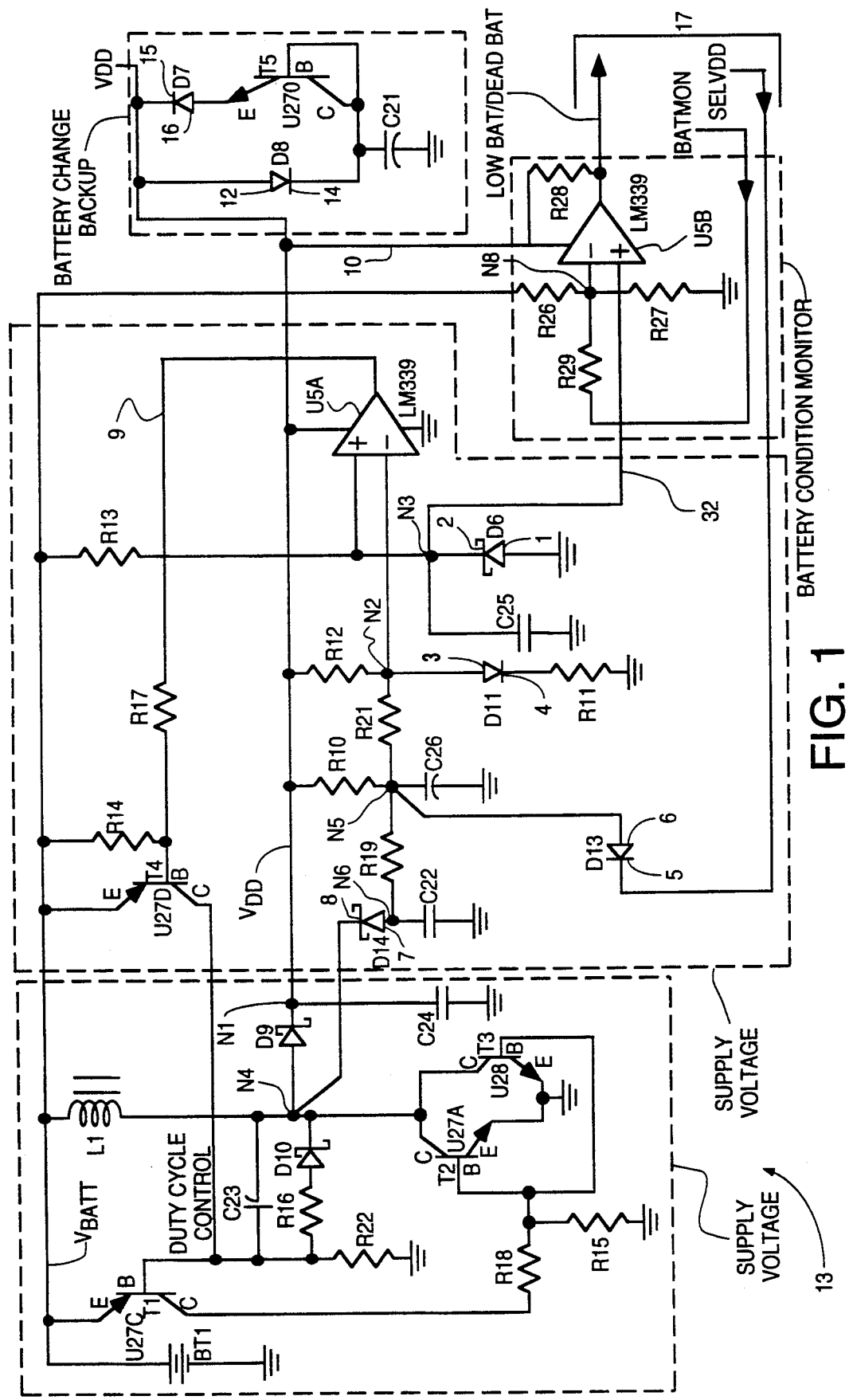
FIG. 1 illustrates the power system.

Referring to FIG. 1, power system 13 of the present invention is illustrated in schematic form and for convenience of description is divided into functional blocks indicated by dashed lines around sections of the schematic. Supply voltage VDD produced by power system 13 is utilized throughout the computer system and as stated above, may be switched between three and five volts based upon the power demands of the computer system or based upon voltage selection control from the computer system which is provided over lines SELVDD. The lines SELVDD, LOW BAT/DEAD BAT, and BATMON indicated in the lower right hand portion of the figure adjacent to reference character 17 are control lines coming from and condition indication lines going to peripheral ASIC of the computer system, which is illustrated in the above-identified copending patent application. The control over SELVDD from the computer system is used to place the power system 13 in either the automatic or the override/forced mode to establish the value of supply voltage VDD. The operation of the power system will be explained in detail hereinafter, however for the purposes of introduction a LOW on SELVDD line (LOW indicating ground) will force the magnitude of VDD to be approximately five volts and the power system will be regulated to maintain VDD at that level. A second condition for SELVDD is to provide for automatic operation in which the magnitude of VDD is automatically determined. That is, an output of VDD of three volts or five volts depends upon the current drawn by the system, and this automatic mode is established by placing SELVDD at float or VDD. With SELVDD at float or VDD, the magnitude of the current drawn by the system determines whether the output will be three or five volts. Under most circumstances it is preferable that the system output voltage (VDD) be three volts. However, it has been found that the preferable parameters for changing VDD from three volts to five volts is that the current requirements of the system be equal to or greater than 10 milliamps and that in addition this flow level continue for approximately 500 milliseconds.

The BATMON line is utilized to control the operation of the battery condition monitor portion of the power system. The source of potential for the power system is battery BT1, which is preferably a pair of AA alkaline cells with initial output of approximately three volts. When the battery voltage drops to 1.8 volts, a low battery indication is provided on the LOW BAT/DEAD BAT line and when the battery voltage reaches approximately 1.6 volts, a dead battery indication is provided to the system over the LOW BAT/DEAD BAT line.

A battery change backup circuit, indicated within the dashed line to the right hand portion of FIG. 1, provides a source of supply voltage for battery change. The operation of the battery change circuit will be explained hereinafter. The remaining portions of power system 13 include the voltage selection section and the supply voltage generation section.

The supply voltage generation section includes battery BT1 having its negative terminal grounded and its positive terminal connected to line $V_{BATT}$. Included in the supply voltage generation section is bipolar transistor T1, having its emitter connected to $V_{BATT}$, its collector connected to one terminal of resistor R18, which is in turn connected to resistor R15 which is connected to ground. A pair of switching transistors T2 and T3 are coupled in parallel for current handling purposes, each of their emitters being connected to ground, their collectors commonly connected and their bases commonly connected and coupled to the junction between resistor R18 and resistor R15. Included in the primary current flow path of transistors T2 and T3 is inductor L1, having one terminal thereof connected to the commonly connected collectors of transistors T2 and T3, and its other terminal connected to $V_{BATT}$ line. Feedback between the collectors of transistors T2 and T3 and the base of transistors T1 is achieved by a first path which includes capacitor C23 and a second path which includes resistor R16 and Schottky diode D10. Schottky diode D10 may be, for example, a Hewlett Packard Corporation Schottky diode part number HP-5082-2810. Resistor R22 provides a path to ground from the base of transistor T1. Schottky diode D9 is coupled between node N4 and node N1. Capacitor C24 is coupled between node N1 and ground. The supply voltage circuit of power system 13 provides a DC to DC conversion of the voltage from battery BT1, this conversion being performed by the oscillator function of the supply voltage circuit which includes transistors T1, T2, and T3, along with their feedback paths, switching on and off. The energy stored in inductor L1 while it is conducting is converted, upon the switching of transistors T2 and T3 to a nonconducting state, to a DC voltage by the rectification through diode D9. The resulting storage of DC potential produces VDD at node N1. More detail of the operation of the supply voltage section will be provided hereinafter in a general description of the power system operation. In practicing the present invention the above described supply voltage generation circuit, which is regulated by an ON-OFF regulation method which is described hereinafter, is the preferred circuit for use in generating the supply voltage (VDD). However, in practicing our invention other types of supply voltage generation circuits, such as, for example, a linear series regulator circuit, may be utilized. An example of this latter type of circuit is the National Semiconductor 3-Terminal Adjustable Regulator available under part numbers LM117, LM217 and LM317.

Figure 4:
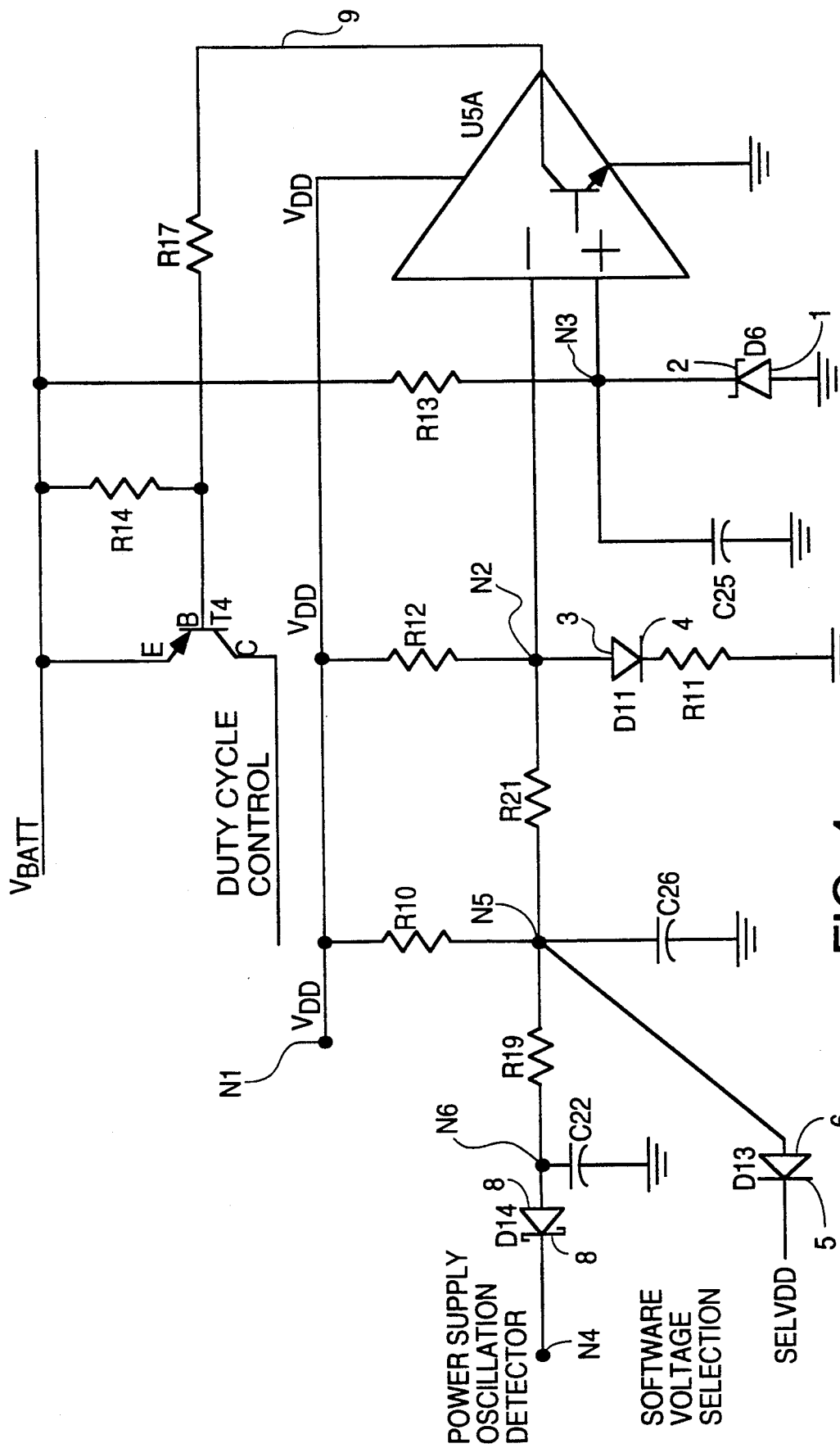
FIG. 4 is an enlarged circuit diagram of the voltage selection circuit of the power system.

Turning to the voltage selection section illustrated in FIG. 1, this section provides voltage regulation as well as voltage selection. As pointed out above, this voltage selection may be automatic as a result of the amount of current supplied to the system over VDD line or may be established at a predetermined level depending on the control signal on line SELVDD. In the present invention the supply voltage circuit is implemented using a switching DC to DC converter and the magnitude of the current supply to the system is sensed based on the duty cycle of the oscillator in the supply voltage circuit. It will of course be appreciated that the present invention may be practiced by utilizing a supply voltage circuit other than a DC to DC switching supply. The voltage selection section is also illustrated in FIG. 4 in a larger scale and reference to FIG. 4 in addition to FIG. 1 may be helpful in understanding the description of the circuit operation as well as its interconnection to the remaining portion of power system 13. To establish a point of reference from which to determine and regulate the supply voltage VDD, a reference voltage is generated at node N3 by connecting resistor R13 between $V_{BATT}$ and node 3 and connecting the Zener diode D6 between node 3 and ground. As illustrated in FIGS. 1 and 4, anode 1 of Zener diode D6 is connected to ground and cathode 2 of Zener diode D6 is connected to node 3. It has been found advantageous to use for diode D6 a Motorola Inc. 1.2 volt band gap reference diode, part number LM385, which provides a potential of 1.2 volts at node N3. Current limiting resistor R13 has a value preferably of 100K ohms. Node N3 is connected to the noninverting input of comparator U5A. The inverting input of comparator U5A is connected to node N2. The voltage at node N2, which is established by voltage divider action, current flow to the computer system and the control signal over SELVDD from the computer system, determines the voltage level to which the power system regulates VDD to achieve either, in the preferred embodiment, three or five volts. Resistor R12, preferably 270K ohms, is connected between VDD and node N2. Diode D11 has its anode 3 connected to node N2, its cathode 4 connected to one terminal of resistor R11 (preferably 75K ohms) and the other terminal of resistor R11 is connected to ground. Diode D11 may be for example a Motorola Inc. 1N914 silicon diode, part number MMBD914L. Diode D11 serves to provide temperature compensation for the power system, which will be more fully described hereinafter. Resistor R21 is connected between node N2 and node N5 and resistor R10 is connected between VDD and node N5. Capacitor C26 has one terminal connected to node N5 and the other to ground. Connected between node N5 and node N6 is resistor R19 (preferably 6.2K ohms) and between node N6 and ground is connected capacitor C22, having a capacitance of 0.1 μf. Diode D13 (which may be of the same type as diode D11) has its cathode 5 connected to control line SELVDD, and its anode 6 connected to node N5. When diode 13 is forward biased by providing ground to cathode 5 via line SELVDD, the resulting voltage level at node N5 will cause VDD to be regulated at five volts independent of the current drawn by the computer system. How this is achieved will be explained fully in the operational description of the voltage selection circuit.

To provide an indication of the level of current being drawn by the computer system, a novel circuit comprising resistor R19 (6.2K ohms), which is connected between node N5 and node N6, along with Schottky diode D14 which has its anode 7 connected to node N6 and its cathode 8 connected to node N4, and capacitor C22 (0.1 μf) which is coupled between node N6 and ground, provides to the voltage selection section an indication of the magnitude of the current supplied to the computer system over supply voltage line VDD. Schottky diode D14 may be for example a Hewlett Packard Corporation Schottky diode part number HP-5082-2810 and Schottky diode D9 may be, for example, a General Instruments Corporation Schottky diode part number SGL41-30.

Comparator U5A operates to regulate the on/off switching of the oscillator in the supply voltage circuit. The output of comparator U5A is connected via line 9 to resistor R17 (30K ohms) which is connected to the base of transistor T4. Transistor T4 has its emitter connected to $V_{BATT}$ line and its collector connected to the base of transistor T1 in the supply voltage circuit. Pull up resistor R14 is connected between $V_{BATT}$ line and the base of transistor T4. Transistor T4 may be for example a Motorola Inc. part number MMPQ6700. The necessity of having the oscillator in supply voltage circuit of the power system 13 running to produce DC voltage at node N1 to keep supply voltage line VDD at a prescribed level is determined by the relative voltages at node N2 and N3 which are connected to comparator U5A at the inverting and noninverting inputs respectively. The output signal on line 9 from comparator U5A controls the conduction of transistor T4 and the voltage on the collector of transistor T4 determines whether transistor T1 is conducting or nonconducting. Briefly, when transistor T4 is conducting, transistors T1, T2 and T3 in supply voltage circuit are nonconducting and correspondingly the converse applies; that is, when T4 is in a nonconducting state, transistors T1, T2 and T3 are permitted to conduct allowing current to flow through inductor L1. When transistors T2 and T3 turn off, the energy stored in L1 is released through Schottky diode D9 where it is rectified and supply voltage VDD generated and stored on capacitor C24. More details of the operation of this circuit will follow.

To help ensure that system data is not lost when the charge condition of the battery becomes low, battery condition monitor circuit (illustrated in FIG. 1) is included in power system 13 to warn the user of the low battery condition. The battery condition monitor includes a comparator U5B, which receives a control signal from the peripheral ASIC of the computer system over BATMON line which is connected to the inverting input of comparator U5B through resistor R29. The output of comparator U5B provides a signal on the LOW BAT/DEAD BAT line to the computer to indicate a low battery or dead battery condition which is sensed by the battery condition monitor. The $V_{BATT}$ line connected to the inverting input of comparator U5B through resistor R26 and the junction of resistors R26 and R29 is coupled to ground through resistor R27. Power to comparator U5B is provided by conductor 10 which connects the VDD line to the power input terminal of comparator U5B. Comparator U5B is of course also grounded, which connection is not shown. Feedback resistor R28 is connected between the LOW BAT/DEAD BAT line and conductor 10. The operation of the battery condition monitor circuit will be described hereinafter in the overall description of the operation of the power system.

To provide power to the system so that operations may continue during the replacement of weak or dead batteries, battery change backup circuit, illustrated in dashed line to the right hand portion of FIG. 1, is provided. Battery change backup circuit includes diode D8 having its anode 12 connected to VDD line and its cathode connected to one terminal of capacitor C21. The second terminal of capacitor C21 is connected to ground. The capacitance of C21 is preferably 0.047 farads. Capacitor C21 serves to store a charge and provide operating potential to the system when the batteries are removed. The other leg of the battery change backup circuit includes diode D7 and transistor T5. Cathode 15 of diode D7 is connected to VDD supply line, and anode 16 of diode D7 is connected to the emitter of transistor T5. The base and collector of transistor T5 are tied together and connected to the junction between the cathode of diode D8. Transistor T5 of course functions as a diode and is utilized for convenience instead of a conventional diode since transistor T5 was conveniently available as part of a multi-transistor pack. It will of course be appreciated that instead of transistor T5, a conventional diode of the same type as diodes D7 or D8 could be utilized. Diodes D7, D8, D11 and D13 may conveniently be implemented with Motorola Inc. 1N914 silicon diodes part number MMBD914L. The operation-of battery change backup circuit will be described in connection with the description of the system operation.

Figure 2A:
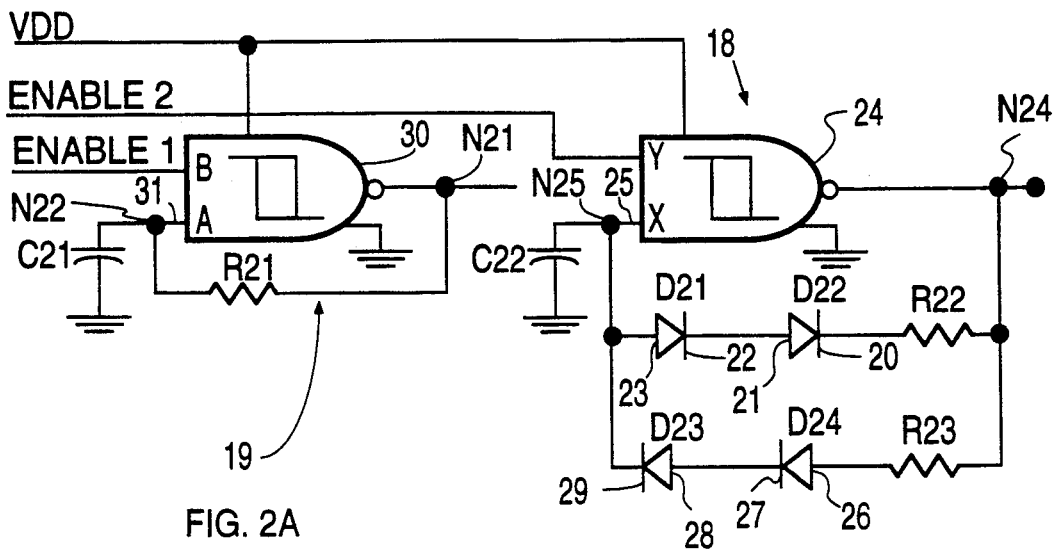
FIGS. 2A-2E illustrate typical oscillators utilized with the computer system.
Figure 2B:
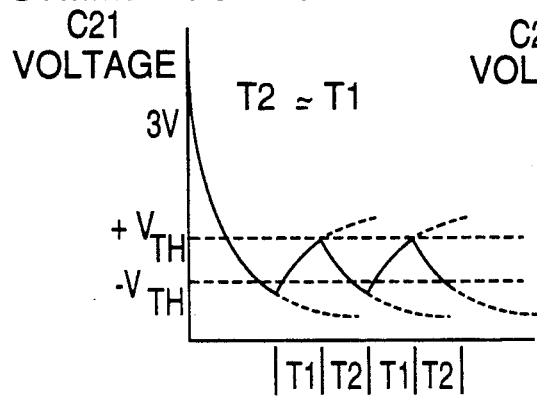
Figure 2C:
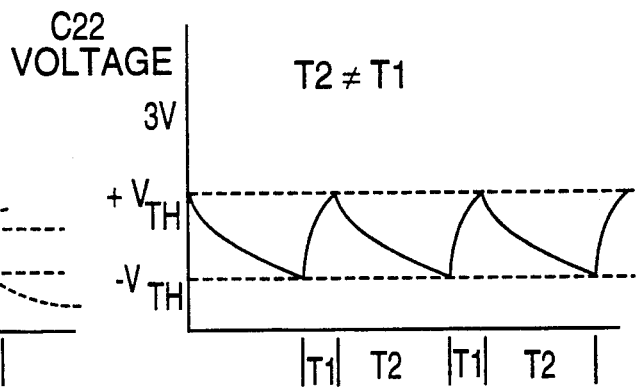
Figure 2D:
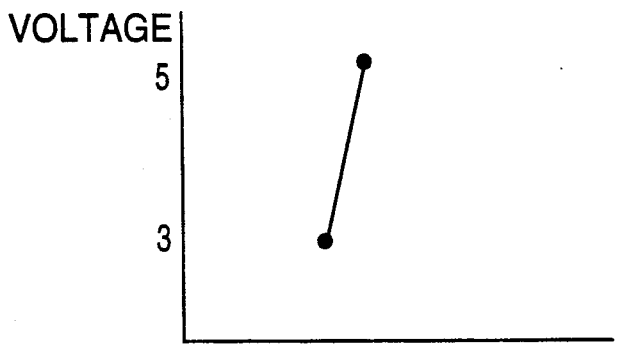
Figure 2E:
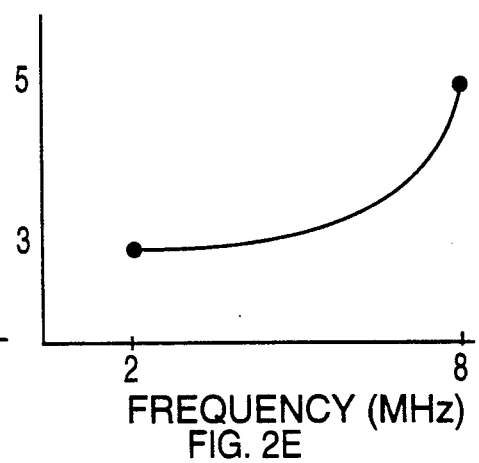

As mentioned earlier, one principle feature of the present invention is the utilization of a system clock which in response to the reduction of the supply voltage provided to it reduces its frequency, and more particularly the system clock frequency is reduced a larger percentage than the voltage. This achieves an additional reduction in the power consumed when the slower system operating speed can be tolerated at the lower clock rate in certain types of operations, such as, for example, word processing. Attention is directed to FIG. 2A wherein the circuit for the system clock circuit 18 is illustrated along with oscillator circuit 19 which provides a second oscillator for the computer system. oscillator circuit 19, however, is constructed such that its frequency is substantially unchanged by a change in supply voltage. However, as illustrated in the accompanying graphs, the output frequency of system clock circuit 18 changes from 2.3 mHz to 6.6 mHz when the supply voltage VDD applied to it changes from 3 to 5 volts. This frequency change is achieved by the feedback circuitry. Looking at system clock circuit 18, NAND gate 24, which may be for example a Texas Instruments Corporation two input NAND gate Part No. 74HC132 (or a similar NAND gate with a Schmidt trigger input), has its output connected to node N24 to provide the oscillation out to the circuitry within the system. The feedback from node N24 consists of a parallel leg of diodes and resistors, more particularly resistor R22 (which may be for example 1.8K ohms) having its first terminal connected to node N24 and its second terminal connected to cathode 20 of diode D22. Anode 21 of diode D22 is connected to cathode 22 of diode D21 and the anode 23 of diode D21 is connected to one terminal of capacitor C22, and the common connection between anode 23 (of diode D21) and capacitor C22 is connected to the X input of NAND gate 24 by conductor 25. The second parallel feedback leg between node N24 and input X of NAND gate 24 includes resistor R23 having one terminal connected to node N24 (resistor R23 being preferably 820 ohms). The other terminal of resistor R23 is connected to anode 26 of diode 24; cathode 27 of diode D24 is connected to anode 28 of diode D23, and cathode 29 of diode D23 is connected to node N25. Diodes D21, D22, D23, and D24 may be, for example, Motorola Inc. 1N914 silicon diodes, Part No. MMBD914L. Capacitor C22 preferably is of 47 pF to achieve the frequency range at lower and upper ends as indicated in the frequency voltage graph adjacent to system clock circuit 18.

Oscillator circuit 19 is of a traditional design in which the frequency is substantially constant even though the value of the supply voltage changes. In the computer system utilizing the present invention, oscillator 19 represents a fixed frequency oscillator which could be, for example, the display system data clock used in the display system described in the above-referenced copending patent application. NAND gate 30 may, for example, be of the same type as NAND gate 24 in system clock circuit 18. The output of NAND gate 30 provides a relatively fixed frequency of approximately 830 Khz at its output terminal (node N21). The feedback from the output to the input of circuit 19 is provided by connecting between node N21 and node N22 resistor R21 (having a resistance of approximately 24K ohms). Node N22 is connected to input A of NAND gate 30 by conductor 31. Capacitor C21, having a capacitance of approximately 47 pf, is connected between node N22 and ground. ENABLE 1 line is connected to NAND gate 30 and ENABLE 2 line is connected to NAND gate 24 to provide the usual enabling function for these gates, thereby permitting the oscillators to operate. The graphs of frequency and voltage and the oscillator waveform for system clock circuit 18 and oscillator circuit 19 are illustrated adjacent to those circuits.

CIRCUIT OPERATION

The operation of power system 13 illustrated in FIG. 1 will be described beginning with the assumption that the circuit has not previously been operated and that battery BTI is installed in the circuit for the first time to rovide $V_{BATT}$ voltage to the circuit. With the assumption that the circuit has not previously been operational, after battery BT1 is installed, the voltage at node N3 will rise and stabilize to 1.2 volts, which is the reference voltage utilized in various sections of the system. This voltage will exceed the voltage at node N2 since we have not previously generated DC potential VDD with the supply voltage section. Therefore the output of comparator U5A, which is connected to the base of transistor T4 by conductor 9, will permit biasing of transistor T1 into operation and cause the oscillator in supply voltage section to oscillate. This begins with transistor T1 turning on, resulting in a current through the base emitter of transistor T1 flowing into resistor R22, which is the start up resistor. Transistor T1 feeds the current into the base of transistors T2 and T3 through resistor R18. This results in an instantaneous voltage drop at the collector of transistors T2 and T3, and these devices turn on. With this voltage drop, conduction through the DC path of resistor R16 and diode D10, as well as the conduction in AC path through capacitor C23 results. Transistors T2 and T3 stay on until the current through inductor L1 becomes sufficiently large that transistors T2 and T3 come out of saturation. This causes the voltage to rise at the collectors of T2 and T3 and this increased voltage reduces the current through resistor R16, diode D10 and the emitter-base path of transistor T1. The increased voltage at the collectors of T2 and T3 also feeds current through capacitor C23 which further reduces the base current through transistor T1. T1 then turns off, which turns off transistors T2 and T3 as well. Resistor R15 serves as a shunt path to ground and assists in discharging the base emitter of transistors T2 and T3, speeding up the process of turning off. The rapid change in current through inductor L1 causes the voltage to rise at node N4, which forward biases diode D9 and pumps charge into capacitor C24. When inductor L1 is discharged, the voltage drops at node N4, which retriggers transistor T1, starting the process anew. It will be appreciated that this circuit operates as a free running oscillator which continues to charge capacitor C24 and increase the voltage on C24 until voltage regulation comes into play via voltage selection circuit. Briefly, when the voltage regulation point is achieved, the output of comparator U5A goes low, which turns on transistor T4 through resistor R17. This pulls the base of transistor T1 near $V_{BATT}$ and prevents transistor T1 from turning on. With transistor T1 off, transistors T2 and T3 are also off and the oscillation ceases.

Figure 5:
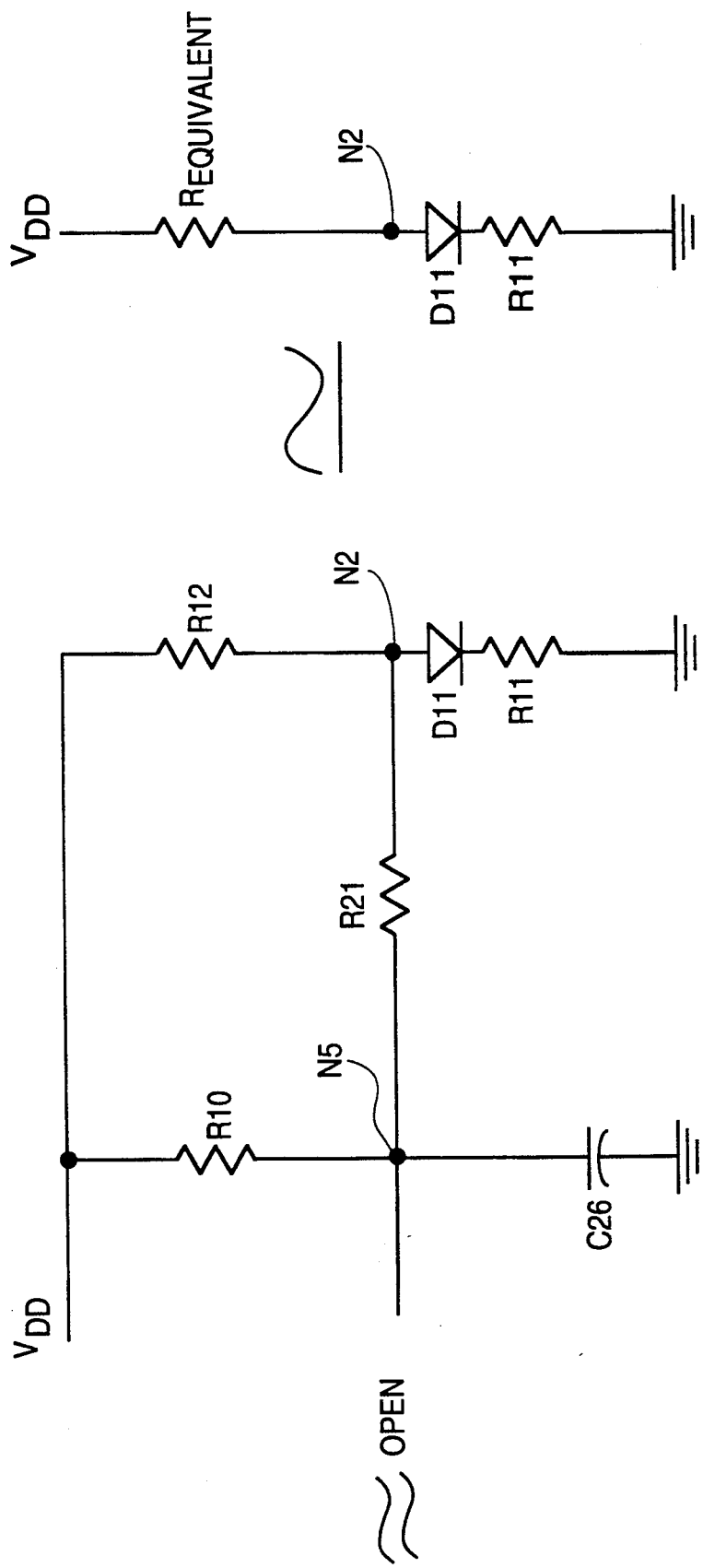
FIG. 5 illustrates the equivalent circuit of a portion of the voltage selection section of the power system for low current operation of the power system.

The voltage selection circuit, which is illustrated in enlarged detail in FIG. 4, utilizes a fraction of the generated supply voltage (VDD) at node N2 and compares this with the reference voltage at node N3. Resistor R13, Zener diode D6 and capacitor C25 generate the reference voltage which is approximately 1.2 volts. When the voltage at the inverting input of comparator U5A exceeds the reference voltage (i.e. $V_{N2} > V_{N3}$) the output transistor in comparator U5A (illustrated in FIG. 4) turns on. When the output transistor of comparator U5A turns on, this turns on transistor T4, which as explained earlier turns off the free running oscillator. When the voltage on VDD line is high (meaning that the regulated voltage required on VDD has been achieved) the oscillator in the supply voltage circuit is not oscillating, and the voltage at node N2 is determined by the voltage divider in the circuit consisting of resistors R10, R12, and R21, diode D11 and resistor R11. The equivalent circuit is illustrated in FIG. 5. At low current levels, the voltage drop across diode D11 is about 0.4 volts. This diode is used rather than using a resistor to provide temperature compensation for the power system. By placing diode D11 at this location in the circuit, a −2.5 millivolt/degree centigrade diode voltage change with temperature provides a positive 0.2% per degree C temperature compensation for any of the voltages selected. This compensates for about half of the temperature variation in CMOS circuits. The voltage at node N2 is forced to be equal to the voltage at node N3 (FIG. 1) by the free running oscillator which is inside the feedback loop. The voltage across resistor R11 is then approximately 0.8 volts. The other leg of the voltage divider is formed by resistor R10 and R21 in series, which are in parallel with resistor R12. This is equivalent to approximately 140K ohms (indicated in FIG. 5 as $R_{EQUIVALENT}$) between node N2 and supply voltage VDD. According to Ohm and Kirchoff laws, the voltage between VDD and node N2 is equal to approximately 1.5 volts. This makes the total voltage at VDD equal to approximately 2.7 volts (since node N2 equals to 1.2 volts). In actual practice, this voltage runs closer to 3 volts. The equivalent circuit approximation assumes a zero duty cycle. The duty cycle gets very low in practice but never goes to zero, so the voltage never gets to 2.7 volts.

Figure 6:
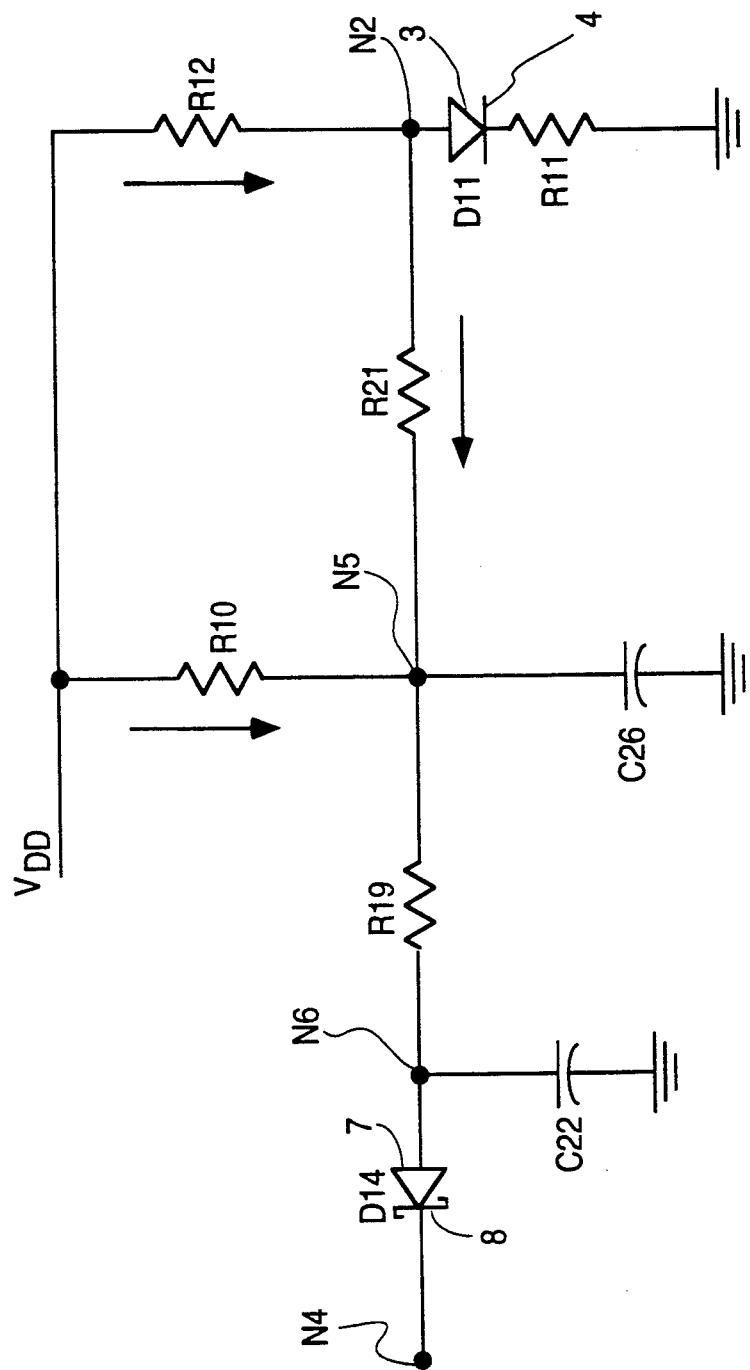
FIG. 6 illustrates the equivalent circuit of the same portion of the voltage selection circuit as illustrated in FIG. 5, but under high current and high voltage conditions.

In FIG. 5, the equivalent circuit about node N2 was illustrated for low current/low duty cycle operation of the supply voltage circuit. For heavy current requirements by the digital system, and resulting in the oscillator in the supply voltage circuit running most of the time, a different equivalent circuit about node N2 is established. This equivalent circuit is illustrated in FIG. 6. When the oscillator in supply voltage circuit is running most of the time due to a heavy current requirement by the digital system, the voltage on capacitor C22 is clamped very close to 0.2 volts because of Schottky diode D14 since the anode of that diode is at approximately 0.2 when the cathode is grounded. This relationship exists of course because when transistors T2 and T3 are conducting, their collectors are essentially at ground. The foregoing results in essentially a clamp circuit, or sample and hold circuit, which is the method used to sense the current in the system. Since the percentage of time that the oscillator in the supply voltage circuit runs is directly proportional to the current being supplied by power system 13, the voltage on capacitor C22 is an accurate indicator of whether or not the power system is providing current to the computer system. This circuit is particularly advantageous since current sensing by this method does not load down the power system as would be the case if a series current sensing device were used. Resistor R19 and capracitor C26 function essentially as a filter which averages the voltage on capacitor C22 and provides a time delay in the process. When the digital system has been drawing high current for approximately one half of a second, the voltage supply (VDD) is changed to the high voltage setting. When this change takes place, it is very rapid because it is the result of a positive feedback process. An increase in the supply voltage (VDD) increases the VCO circuit output frequency which increases the current draw, which increases VDD, etc. The arrows adjacent to the resistors in FIG. 6 indicate the current flow direction when a heavy load condition exists. The equations set forth below illustrate the calculation of the approximate VDD high voltage through the solution of currents at node N2 and node N5.

NODE 5 CURRENTS $$\frac{VDD - V_{N5}}{100K} + \frac{1.2 - V_{N5}}{270K} = \frac{VN5 - .2}{6.2K}$$

$$VDD - V_{N5} + \frac{100}{270}(1.2 - V_{N5}) = \frac{100}{6.2}(V_{N5} - .2)$$

$$VDD - V_{N5} + .44 - .37\, V_{N5} = 16.1\, V_{N5} - 3.2$$
$$VDD = 17.47\, V_{N5} - 3.64$$

NODE 2 CURRENTS $$\frac{VDD - 1.2}{270K} = \frac{.8}{75K} + \frac{1.2 - V_{N5}}{270K}$$

$$VDD - 1.2 = \frac{270}{75}(.8) + 1.2 - V_{N5}$$

$$VDD = 5.28 - V_{N5}$$

Taking $VDD$ from the above two and equating them:
$$17.47\, V_{N5} - 3.64 = 5.28 - V_{N5}$$
$$V_{N5} = .48 \text{ volts}$$

Substituting $V_{N5}$ into the Node 5 equation provides:
$$VDD = 17.47\,(.48) - 3.64$$
$$VDD = 4.75 \text{ volts}$$

In actual practice, VDD is closer to 5 volts because node N4 goes slightly below ground due to the inductor "ringing" when the voltage reverses in the coil. This causes C22 to clamp to a voltage lower than 0.2 volts and raises VDD slightly.

Figure 3A:
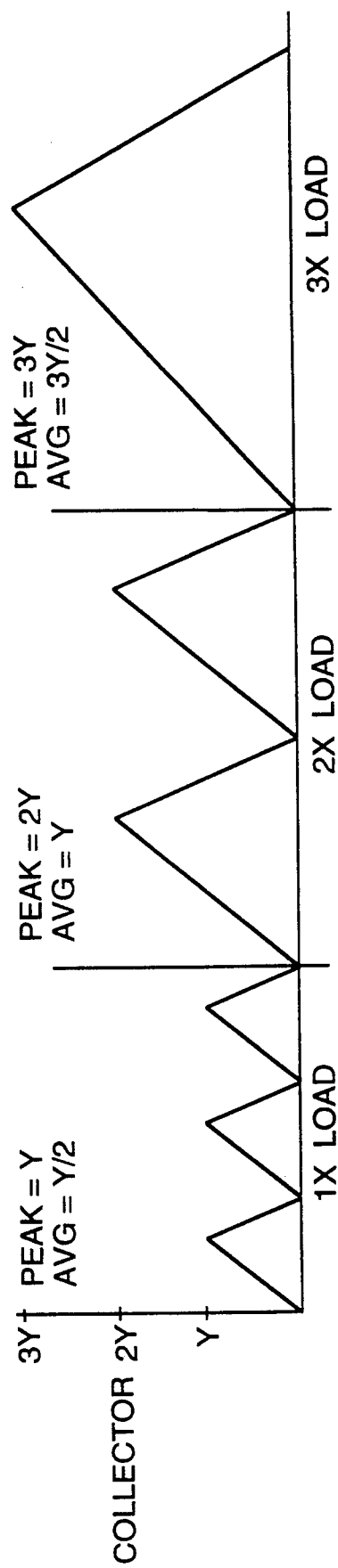
FIGS. 3A and 3B illustrate the waveforms for the on switching of the supply voltage generator portion of the power system.
Figure 3B:
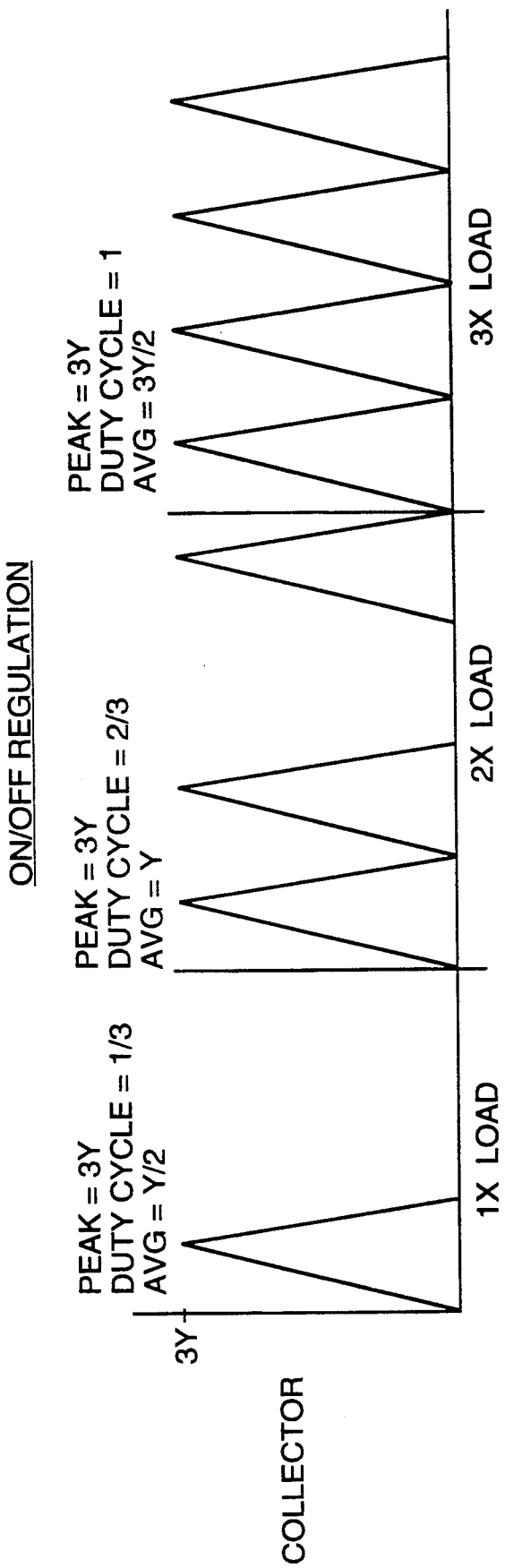

FIGS. 3A and 3B illustrate on/off switching of the supply voltage circuit with the preferable scheme and the one used in the present invention being illustrated in FIG. 3B. The technique illustrated in FIG. 3B, as will be appreciated by reference to the load conditions, switches the oscillator on and off by utilizing equal width pulses with the number of pulses provided per unit time varying depending on the load. In contrast a typical scheme utilized in the prior art is illustrated in FIG. 3A in which the base current to the switching transistor is changed based on a current input to the base to provide effectively pulse width modulation in turning the transistor on.

As described above, the current requirement sensing is achieved by connecting the cathode 8 of diode D14 to the collectors of transistors T2 and T3, however other possible embodiment include the connection of cathode 8 to node N24 of system clock circuit 18 illustrated in FIG. 2A, or connection of cathode 8 to a logic signal in which a low voltage level indicates that an oscillator which runs based on high current demand is running or that a high supply voltage (VDD) is desired. This is advantageous when utilizing a single system oscillator which is switched on and off. However, in situations where a number of oscillators may be turned on and off, it is preferable to utilize the construction illustrated in FIGS. 1 and 4. Capacitor C22 in FIG. 1 may need to be adjusted when the circuit is utilized by connecting the cathode of diode D14 to node N24 and the capacitance would be possibly reduced downward due to the higher frequency of the system oscillator (higher than the switching frequency of the oscillator in the supply voltage circuit).

The foregoing illustration assumes that the SELVDD line is either at float or VDD which places the system in the automatic operation for achievement of either 3 or 5 volts based on the current flow. Under certain circumstances it is desirable that the supply voltage be locked at approximately 5 volts without regard to the current requirements of the digital system and this is achieved by providing an automatic voltage selection override circuit. To achieve this, SELVDD line is grounded, which results in the voltage supply VDD being forced to approximately 5 volts. In the operation of the system, the SELVDD line, illustrated in FIG. 4 and as illustrated in FIG. 1 as well, is connected to a tristate CMOS output device in the peripheral ASIC of the computer system. The SELVDD line is pulled to ground when high voltage is desired. It will be appreciated that, particularly with reference to FIG. 4, the voltage drop through diode D13 when the SELVDD line is grounded is approximately the same voltage drop that occurred in the automatic operation for high current requirements when the drop through R19 and D14 occurred when cathode 8 of diode D14 is low since diode D14 is a Schottky diode and diode D13 is a silicon diode. In both the automatic and override mode of operation, node N5 ends up at approximately 0.4 to 0.5 volts which permits the selection of the high voltage through either SELVDD control or the current sensing through resistor R19 and diode D14.

Referring to FIG. 1, it will be recalled that the system includes a battery condition monitor section which provides an indication of the relative condition of the charge on the battery. The battery voltage is sensed by a voltage divider consisting of resistor R26 and R27 and this voltage is compared to the reference voltage from node N3 which is connected to the noninverting input of comparator U5B by conductor 32. The initial condition of line BATMON is to have that input grounded, resulting in resistors R26, R27 and R29 forming a voltage divider with the common terminal connected to the inverting input of comparator U5B. After a low battery voltage condition is detected, BATMON line is open circuited, which changes the voltage level at node N8, which triggers the comparator to a lower level. This permits the same circuit to look for the dead battery level as well as for the low battery condition. When the dead battery level is detected, the output on LOW BAT/DEAD BAT line prevents data transfer in the system by providing an interrupt to the peripheral ASIC chip, described in copending patent application Ser. No. 07/373,440 filed on Jun. 30, 1989, entitled "Computer Power Management System". This safeguard is used in conjunction with the VCO oscillator being reduced to a lower operating frequency in situations where the current requirements of the system are such that a 5 volt level cannot be achieved. Under those circumstances, supply voltage VDD will be less than 5 volts and the system clock frequency, which is generated from system clock circuit 18, will be reduced to prevent any loss of data being processed by the system.

In connection with the operation of the battery change backup circuit illustrated in FIG. 1, capacitor C21 charges to one diode drop below the level of supply voltage VDD during system operation. When VDD voltage drops significantly, for example when the batteries are removed for change, capacitor C21 provides voltage to maintain supply voltage VDD at two diode drops less than the voltage on capacitor C21. If VDD had been operating at 5 volts, capacitor C21 would begin to supply backup supply voltage on the VDD line when the voltage level on VDD drops below approximately 3.5 volts. To adjust these foregoing voltage levels, additional series diodes may be added or fewer diodes utilized. To optimize the performance of the system, the system software includes instructions which cause the supply voltage VDD to be increased to 5 volts momentarily each time the system is turned off, thus providing the maximum charge available to diode capacitor C21. In addition, the user is instructed to turn the unit on and then turn it off before changing batteries which ensures that the system will charge up to 5 volts before the batteries are removed allowing the maximum discharge time for capacitor C21.

The foregoing is illustrative of the present invention. However, various modifications and changes will be anticipated by those skilled in the art for practicing the invention without departing from the spirit and scope thereof. It is of course understood that the invention is not limited to the above description, but only by the following claims.

We claim:

1. A power system for providing a supply voltage to a computer and automatically varying said supply voltage responsive to themagnitude of the current being supplied to the computer, said power system comprising:
   a supply voltage circuit for generating at an output terminal said supply voltage and said current being supplied to the computer, said supply voltage circuit having a control terminal for receiving a control signal for varying said supply voltage between a first voltage level and a second voltage level in accordance with the magnitude of said control signal; and
   a current sensing circuit for sensing said current provided to the computer, said current sensing circuit generating at its output said control signal such said control signal varies in magnitude in accordance with said current sensed, so as to vary said supply voltage between said first and second voltage levels.

2. A power system as in claim 1, wherein said control signal having first and second states and said supply voltage circuit comprises an on-off regulator circuit receiving said control signal, said on-off regulator circuit being turned on and off, respectively, in response to said first and second states of said control signal.

3. A system as in claim 2, wherein said current sensing means senses said current provided to the computer by sensing a percentage of time that said on-off regulator turns on.

4. A system as in claim 2, wherein said on-off regulator comprises an on-off oscillator.

5. A power system as in claim 1, wherein said current sensing circuit comprises:
   a circuit for converting said current into a voltage level; and
   a comparator circuit receiving said voltage level and a predetermine voltage and for providing as an output signal said control signal.

6. A power system as in claim 5, wherein power of operation of said computer is provided by a battery, said power system further comprising a battery monitor circuit, said battery monitoring circuit varies said predetermined voltage in accordance with the charge condition of said battery.

7. A power system as in claim 1, wherein said current sensing circuit comprises a switching DC to DC converter.

8. A power system as in claim 1, further comprising a frequency control circuit for generating clock signal for said computer, said frequency control circuit varies the frequency of said clock signal in accordance with said magnitude of said supply voltage.

9. In a power system, a method for providing a supply voltage to a computer and for automatically varying said supply voltage responsive to the magnitude of current being supplied to the computer, said method comprising:
   providing a supply voltage circuit for generating at an output terminal. said supply voltage and said current being supplied to the computer, said supply voltage circuit being provided a control terminal for receiving a control signal for varying said supply voltage between said a first voltage level and a second voltage level in accordance with the magnitude of said control signal;
   providing a current sensing circuit for sensing said current provided to the computer, said current sensing circuit generating at its output said control signal such that said control signal varies in magnitude in accordance with the current sensed; and
   provide said control signal to said control temrinal so as to vary said supply voltage between said first and second voltage levels.

10. A method as in claim 9, wherein said control signal having first and second states and said step of providing a supply voltage circuit comprises the step of providing an on-off regulator circuit receiving said control signal, said on-off regulator circuit being turned on and off, respectively, in response to said first and second states of said control signal.

11. A method as in claim 10, wherein said on-off regulator comprises an on-off oscillator.

12. A method as in claim 10, wherein said current sensing means senses said current provided to the computer by sensing a percentage of time that such on-off regulator turns on.

13. A method as in claim 9, wherein said step of providing a current sensing circuit comprises the steps of:
   providing a circuit for converting said current into a voltage level; and
   providing a comparator circuit receiving said voltage level and a predetermined voltage and for providing as an output signal said control signal.

14. A method as in claim 13, wherein power for operation of said computer is provided by a battery, said method further comprising the step of providing a battery monitor circuit, said battery monitoring circuit varies said predetermined voltage in accordance with the charge condition of said battery.

15. A method as in claim 9, wherein said step of providing a current sensing circuit comprises the step of providing a switching DC to DC converter.

16. A method as in claim 9, further comprising the step of providing a frequency control circuit for generating a clock signal for said computer, said frequency control circuit varies the frequency of said clock signal in accordance with said magnitude of said supply voltage.

* * * * *

UNITED STATES PATENT AND TRADEMARK OFFICE
CERTIFICATE OF CORRECTION

PATENT NO. : 5,307,003                   Page 1 of 2
DATED : April 26, 1994
INVENTOR(S) : John P. Fairbanks, et al It is certified that error appears in the above-indentified patent and that said Letters Patent is hereby corrected as shown below:

Col. 6, line 11, delete " ' ".

Col. 11, line 35, delete $$'' \frac{1.2 - VN5}{270K} = \frac{VN5 - .2}{6.2K} ''$$

and insert $$-- \frac{1.2 - V_{N5}}{270K} = \frac{V_{N5} - .2}{6.2K} --$$

UNITED STATES PATENT AND TRADEMARK OFFICE
CERTIFICATE OF CORRECTION

PATENT NO. : 5,307,003
DATED : April 26, 1994
INVENTOR(S) : John P. Fairbanks, et al It is certified that error appears in the above-indentified patent and that said Letters Patent is hereby corrected as shown below:

Col. 13, line 51, insert a space between "the" and "magnitude".

Col. 14, line 18, delete "predetermine" and insert --pedetermined--.

Col. 14, line 53, delete "temrinal" and insert --terminal--.

Signed and Sealed this

Twenty-first Day of February, 1995

Attest:

BRUCE LEHMAN

*Attesting Officer*     *Commissioner of Patents and Trademarks*